Aug. 27, 1929.  F. G. STUCKLESS  1,726,004
AUTOMOBILE ACCESSORY
Filed Sept. 24, 1928
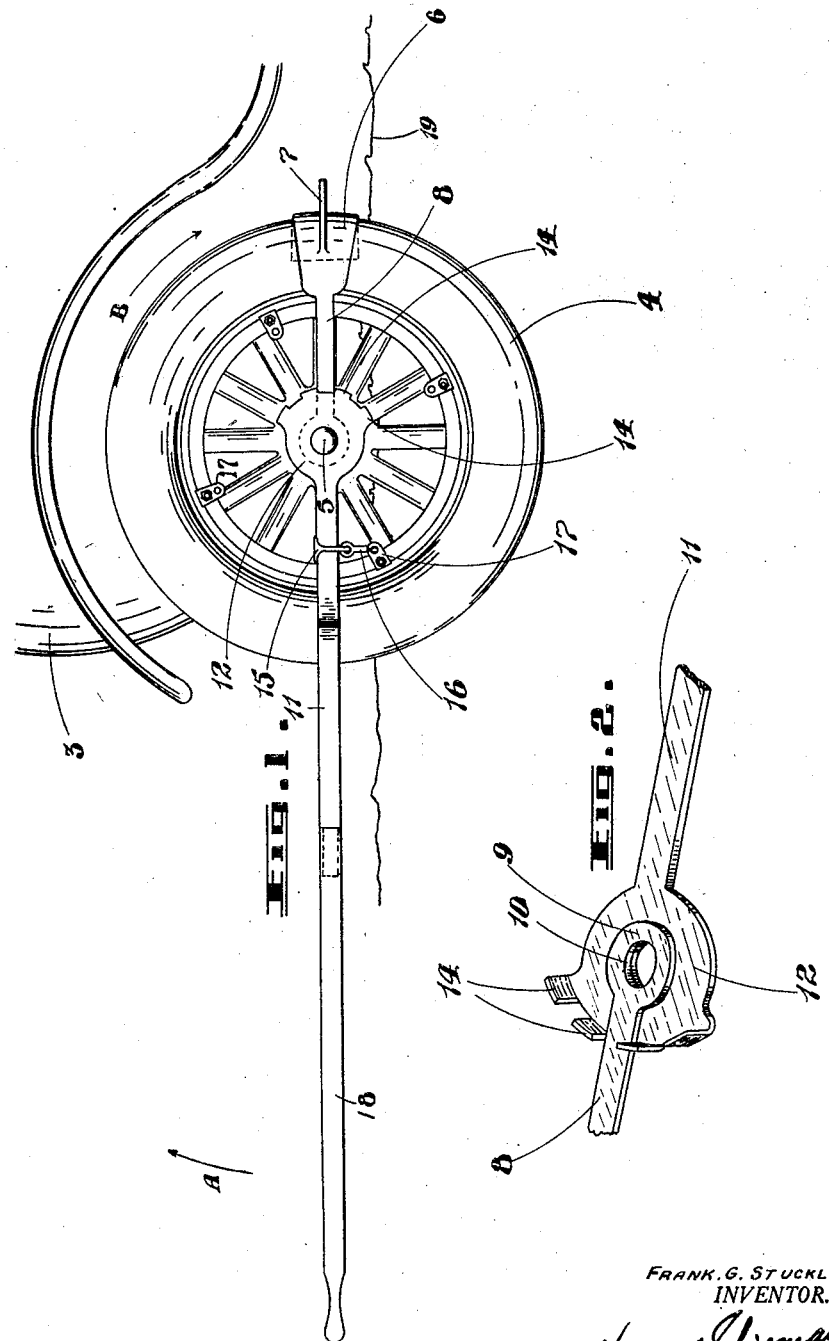
FRANK. G. STUCKLESS.
INVENTOR.
BY Harold C. Shipman
ATTORNEY.

Patented Aug. 27, 1929.

1,726,004

UNITED STATES PATENT OFFICE.

FRANK G. STUCKLESS, OF TWILLINGATE, NEWFOUNDLAND.

AUTOMOBILE ACCESSORY.

Application filed September 24, 1928. Serial No. 307,813.

This invention relates to an automobile accessory and particularly to a construction designed to assist in the pulling out of imbedded automobile wheels.

The object of my invention is to provide a simple construction which can be knocked down to compact size and conveniently stored in compartment in the car for storing accessories.

A further object is to provide a means whereby considerable leverage may be obtained directly on the centre of the wheel with the end of the accessory providing a gripping fulcrumed point engageable with the road bed.

A further object is to provide a means whereby the lever may be adjusted to various adjustable positions of advantage during the raising and turning of the wheel.

With the foregoing and other objects in view, as will appear as the description proceeds, the invention consists of the novel construction, combination and arrangement of co-operating elements as hereinafter more specifically set forth, claimed and shown in the accompanying drawings forming a part of the present application, in which:

Fig. 1 is a side elevation of the preferred embodiment of my invention shown in position relative to a wheel.

Fig. 2 is an inside perspective view of the interengagement means between the parts of the preferred embodiment of my invention.

Like numerals of reference designate corresponding parts throughout the different views.

3 is an automobile body to which the wheel 4 is suitably mounted. The wheel is retained on a suitable axle by an ordinary means covered in the usual manner by a hub cap 5, which hub cap is generally threadedly engaged over a stub extension of the hub portion of the wheel. Thus, there is rigidity in this stub extension of the hub.

6 is a rim shoe having a transverse gripping plate 7 extending outwardly therefrom. An integral arm 8 is designed to extend inwardly and is provided with an enlarged inner end 9, having a central opening 10 therein designed to fit over the hereinbefore mentioned stub extension of the hub portion of the wheel 4.

11 is a lever, the end of which is enlarged as at 12 and provided with inwardly bent spaced fingers 14. These fingers are spaced apart sufficient to snugly fit against the edges of the arm 8. 15 is a clevis supported on the lever 11 and provided with a hook 16. 17 are wheel clamps provided with an inwardly extended portion having an opening formed therein into which the hook 16 is adapted to engage. This hook may engage in any outer part of the wheel instead of to the clamps if desired. 18 is an extension lever adapted to telescopically engage with the outer end of the lever 11.

On Fig. 1, I have shown an irregular line 19, which designates the normal road surface, the bottom of the wheel 14 supposedly being imbedded in a road rut. The accessory is placed on the wheel in the position as shown in Fig. 1 and the free end of the extension lever 18 moved in an upward direction as indicated by the arrow A which will turn the wheel in the direction of the arrow B until the transverse gripping plate 7 contacts with the normal road surface 19 and provides a fulcrum on which the rim shoe 6 will contact. A further raising of the outer end of the extension lever 18 will tend to raise the wheel out of the road rut so as to permit a person to put a plank or filling into the rut under the portion of the wheel 4 which is imbedded therein. The enlarged end 12 of the lever 11 may then be moved outwardly, the outer end of the extension lever 18 dropped in opposite direction to the arrow A after which the enlarged end 12 is replaced with other fingers 14 engaging on the edges of the arm 8 so that another lift may be obtained relative to the wheel 4.

The foregoing specification and annexed drawings disclose the preferred embodiment of my invention, but it is to be understood that minor changes may be resorted to in the commercial adaptation of my invention without departing from the scope of the invention as hereinafter claimed.

What I claim as new is:

An auxiliary attachment for automobiles comprising a rim shoe, having an outwardly protruding gripping blade; an inwardly extending arm from said shoe provided with an opening adjacent the inner end thereof, which opening will fit over the hub portion of an automobile wheel; a lever having an enlarged inner end portion; said enlarged portion having a central opening adapted to fit over said hub portion; said enlarged end portion also having radially spaced and inwardly directed fingers, which fingers adjustably engage over said arm intermediate the ends thereof; means carried by said lever for engagement with an outer portion of the rim of said wheel and a removable extension for said lever.

In testimony whereof, I affix my signature.

FRANK G. STUCKLESS.